US007149978B1

(12) United States Patent
Maffezzoni

(10) Patent No.: US 7,149,978 B1
(45) Date of Patent: Dec. 12, 2006

(54) METHODS FOR MANAGING HOST ADAPTER SETTINGS

(75) Inventor: Guido Maffezzoni, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 614 days.

(21) Appl. No.: 09/752,504

(22) Filed: Dec. 27, 2000

(51) Int. Cl.
*G06F 17/00* (2006.01)
*G06F 9/44* (2006.01)

(52) U.S. Cl. .............. 715/762; 715/763; 715/771; 717/120; 717/174

(58) Field of Classification Search ........ 345/735–736, 345/741, 747; 713/1; 715/735–747, 762, 715/763, 771, 753; 717/120, 174
See application file for complete search history.

(56) References Cited

U.S. PATENT DOCUMENTS 6,101,555 A * 8/2000 Goshey et al. ............. 719/321
6,105,130 A * 8/2000 Wu et al. ..................... 713/2
6,327,613 B1 * 12/2001 Goshey et al. ............. 709/208

OTHER PUBLICATIONS

Symbios Inc., PCI SCSI Device Management System SDMS 4.0, 1998.*
Sun Microsystem, Sun StorEdge A5000 Installation Guide, 1998.*
Mylex Corporation, MYLEX MultiMaster Fast SCSI (EISA) Host Adapters BT-746C/747C☐☐Installation Guide and User Manual, 1997.*

\* cited by examiner

*Primary Examiner*—Tadesse Hailu
(74) *Attorney, Agent, or Firm*—Martine Penilla & Gencarella, LLP

(57) ABSTRACT

A method for managing the configuration of a host adapter is provided. The method provides for the access and configuration of a host adapter from within the computer operating system. Icons and graphical user interfaces are displayed providing a plurality of configuration options and diagnostic tools to allow access, evaluation, management and testing of host adapters and peripheral devices connected thereto in a manner with the look and feel of any other computer system device. When configuration changes are input, the method provides a prompt indicating the system must be rebooted for the changes to be implemented, and a reboot command for the user to execute. While executing the reboot command, the system flashes the host adapter configuration changes to the EEPROM on the host adapter, and the system initializes in accordance with the changed configuration settings. In addition to the method for managing the host adapter and associated configuration, also provided is the computer readable media with program instructions implementing the method.

25 Claims, 19 Drawing Sheets

METHODS FOR MANAGING HOST ADAPTER SETTINGS

BACKGROUND OF THE INVENTION

1. Field of the Invention

The present invention relates generally to host adapters attached to computer systems, and more particularly to methods for accessing and managing the configuration and implementation settings of host adapters attached to computer systems.

2. Description of the Related Art

Computer systems, applications, and implementations represent an ever expanding and developing field of technology. Specific systems continue to evolve for specialized use ranging from individual desktop systems, to networked workstations, to network servers, cluster servers and beyond. Applications demand more and faster resources to manage, produce, and process data at discrete systems and across networks and the World Wide Web. An individual user often requires resource beyond a basic computer system to such peripheral devices as supplemental hard disk drives, high volume storage media, CD-RW devices, DVD drives, scanners, photographic processors, and the like. Computer systems typically provide various options for connecting to and utilizing peripheral devices, but the demand for flexibility and connectivity in computer systems continues to grow and create unmet needs.

In general, flexibility of a computer system relates to the ease and ability of a computer system to access and utilize data in a multitude of forms and volumes. Connectivity refers to the capability of a computer system to access and utilize multiple peripheral devices for managing data in multiple formats. Therefore, in order to increase flexibility, it is desirable to increase the connectivity of a computer system.

In order to increase connectivity, computer systems are typically configured with expansion slots capable of receiving a variety of circuit boards that have various functions. Among the type of circuit boards which may be inserted include network interface cards (NICs) which allow the computer to connect to a network, and host adapters which allow computer systems to be configured with one or more local peripheral devices. The most commonly used host adapters are DMA or Ultra-DMA host adapters which are capable of supporting up to four peripheral devices on two channels with two devices per channel, and small computer system interface (SCSI) host adapters which can support up to thirty peripheral devices. Once peripheral devices are connected to the host adapter and appropriately configured, the peripheral devices are integrated into the computer system.

The plurality of devices of a computer system, both on-board system devices and peripheral devices, require specific settings and configurations in order to properly operate as an integrated system. By way of example, a computer system may contain a processor, a mother board, memory, a hard disk drive, a floppy drive, a monitor, a keyboard, a mouse, a printer, a modem, speakers, and all of the necessary interface boards and enhancement devices to assimilate and coordinate the various devices to operate as a computer system. If the computer system is configured with Microsoft Windows95™ or newer operating systems, a user can open a graphical user interface (GUI) such as My Computer, Windows® Explorer, Control Panel, or Internet Explorer to see, access, and configure many of the devices that are integrated into the computer system. Host adapters, however, are typically configured at the system level through the basic input/output system (BIOS) and not easily accessed, configured, or understood by the typical computer user.

SCSI host adapters contain electrically erasable programmable read only memory (EEPROM) chips which are programmed with configuration settings for the SCSI host adapter, and for the peripheral devices attached to the host adapter. When the computer boots up, the BIOS of the computer communicates with the EEPROM chip of the SCSI host adapter to determine what devices are connected to the host adapter and connected to the computer through the host adapter. The BIOS also determines the settings of the host adapter card and initializes the computer system in accordance with the settings. Once the boot sequence is complete and Windows® loads, the host adapter and the connected peripheral devices are set and no configuration settings or changes are possible for the host adapter or the peripheral devices as managed by the host adapter in the Windows® environment. In order to make any changes to the SCSI host adapter board settings, the user must shut down Windows® and access the SCSI host adapter through the BIOS.

Once Windows® has loaded, many system devices are accessible through GUIs such as My Computer, Control Panel, Windows® Explorer, and Internet Explorer as described above, and some configuration setting is possible, but such configuration is generally limited to computer system settings. By way of example, settings related to the computer system processing of certain devices can be modified in the Windows® environment. Such settings include memory use, interrupt setting, DMA channel, and the like. Some Windows® environments (e.g., Windows NT™) also display that a host adapter is connected to the system and allows for system settings access, but does not provide for access to the settings for the host adapter itself, or for the peripheral devices connected to the host adapter.

Thus, when a user desires to access and configure, or trouble-shoot, a host adapter, the user must gain access through the BIOS prior to the Windows® operating system loading. While SCSI offers significant connectivity advantages, the current method of access and configuration of host adapters can limit flexibility when a user is unfamiliar with a computer system's BIOS, how to access the BIOS, and how to understand and change host adapter settings through the computer system BIOS.

In view of the foregoing, there is a need for a method and system to permit access to determine the presence and configuration of a host adapter, the presence and configuration of peripheral devices connected to the host adapter, and the ability to edit and manage the settings of the host adapter and connected peripheral devices. Such access should be easily understood and utilized by a user working in a Windows® environment to increase the flexibility and connectivity of a computer system. The method and system of access and ability to edit and manage host adapters and peripheral devices connected to host adapters should be configured to avoid the problems of the prior art.

SUMMARY OF THE INVENTION

Broadly speaking, the present invention fills the aforementioned needs by providing methods, systems, and computer readable media for allowing access to manage host adapter configuration from a Windows® operating system. The invention presents a host adapter as any other system device presented in a plurality of graphical user interfaces, allowing for the configuration and management of the host adapter as well as any peripheral devices connected to the host adapter. It should be appreciated that the present invention can be implemented in numerous ways, including as a process, an apparatus, a system, a device, a method, or a computer readable media. Exemplary embodiments of the present invention are described below.

In accordance with one aspect of the invention, a method for managing a configuration of a host adapter for a computer is provided. The method includes generating a graphical user interface which allows a user to access configuration settings of the host adapter, and then managing the configuration settings of the host adapter by using of the graphical user interface to create configuration changes. The configuration changes are saved to a file in a storage location. The method then provides for the rebooting of the computer, and reading the configuration changes saved to the file in the storage location during the reboot. The method further provides for the writing of the configuration changes to a nonvolatile memory of the host adapter of the computer, and then activating the configuration changes during the rebooting of the computer.

In accordance with another aspect of the invention, a method is provided for accessing and managing a configuration of a host adapter for a computer. The method includes generating a graphical user interface, and accessing and managing the configuration of the host adapter through the graphical user interface. The accessing and managing of the configuration includes making changes to the configuration. The method then provides for saving the changes to the configuration to a registry key. Next, a command is received to reboot the computer, and the method provides for executing the reboot command and initiating a reboot operation. The method further provides that, during the reboot operation, the changes to the configuration that were saved to the registry key are read, and then written to a nonvolatile memory of the host adapter of the computer.

In accordance with yet another aspect of the invention, a method for enabling graphical user interface driven modifications of settings in an EEPROM associated with a SCSI host adapter connected to a computer is provided. The method includes displaying a graphical user interface which provides a list of selectable configuration options, and receiving user selections of changes to the configuration. The method then provides for writing the user selections to a storage location, followed by initiating a reboot of the computer. Next, the method writes the user selections from the storage location to the EEPROM, and then completes the rebooting, The SCSI host adapter is configured to operate in accordance with the user selections.

In accordance with a further aspect of the invention, a computer readable media having program instructions for managing configuration settings of a SCSI host adapter for a computer is provided. Program instructions are provided for generating a graphical user interface which is configured to allow a user to access the configuration settings of the SCSI host adapter, and for generating a functional SCSI icon configured to provide direct graphical user interface driven access to enable configuration settings modifications. Further, program instructions are provided for selecting configuration settings modifications of the SCSI host adapter by way of the graphical user interface to create configuration changes. The configuration changes are saved to a file in a storage location. The program instructions then reboot the computer and read the configuration changes saved to the file in the storage location. Next, the program instructions include writing the configuration changes to a nonvolatile memory of the SCSI host adapter of the computer, and activating the configuration changes for the SCSI host adapter during the rebooting of the computer.

In accordance with still a further aspect of the invention, a computer readable media is provided having program instructions for accessing and managing a configuration of a host adapter of a computer. The program instructions include providing a graphical user interface which is configured to provide access to the configuration of the host adapter of the computer, and program instructions for managing the configuration of the host adapter of the computer by allowing a user to make configuration changes to the host adapter through the graphical user interface. The program instructions further provide for receiving the changes to the configuration of the host adapter and writing the changes to a registry key. The user is informed that a reboot operation is required for the configuration changes of the host adapter to be implemented, and program instructions provide the user with a reboot command and prompt the user to execute the reboot command. Further, program instructions are provided for receiving the reboot command and initiating the reboot operation. The configuration changes are read from the registry key, flashed to an EEPROM of the host adapter, and then the program instructions provide for completing the reboot operation by shutting down an operating system and starting a boot sequence.

The advantages of the present invention are numerous. One notable benefit and advantage is that the invention allows the average computer user the ability to see and manage the configuration of a host adapter of a computer system. Because the prior art host adapter management is BIOS-based, it is generally inaccessible and unknown to the average computer user. The present invention gives the host adapter the look and feel of any other computer system component, visible and accessible through the operating system.

An additional benefit is the ease of configuration using the present invention. By implementing the use of graphical user interfaces, the present invention allows configuration of the host adapter as well as the peripheral devices connected to the host adapter with selection boxes that a user can select or disable as desired. Further, the user can make configuration changes and then run diagnostic tests to verify performance with changes in configuration changes. Further, the present invention provides for simulation of configuration options such that a user can design a system configuration and evaluate the performance and compatibility prior to the actual installation of the hardware.

A further benefit is the ability to monitor host adapter performance using various tools provided by the present invention. Trouble shooting can be easily accomplished, and managed by telephone support without necessitating an on-site visit by tech support. Because the graphical user interface is familiar and comfortable to the average user, the ability to navigate and select various tools and support services of the present invention is available to all users, and can be easily evaluated and communicated over the telephone, internet, or other remote systems.

Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF EXEMPLARY EMBODIMENTS

An invention for a method and system for managing settings of a host adapter is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
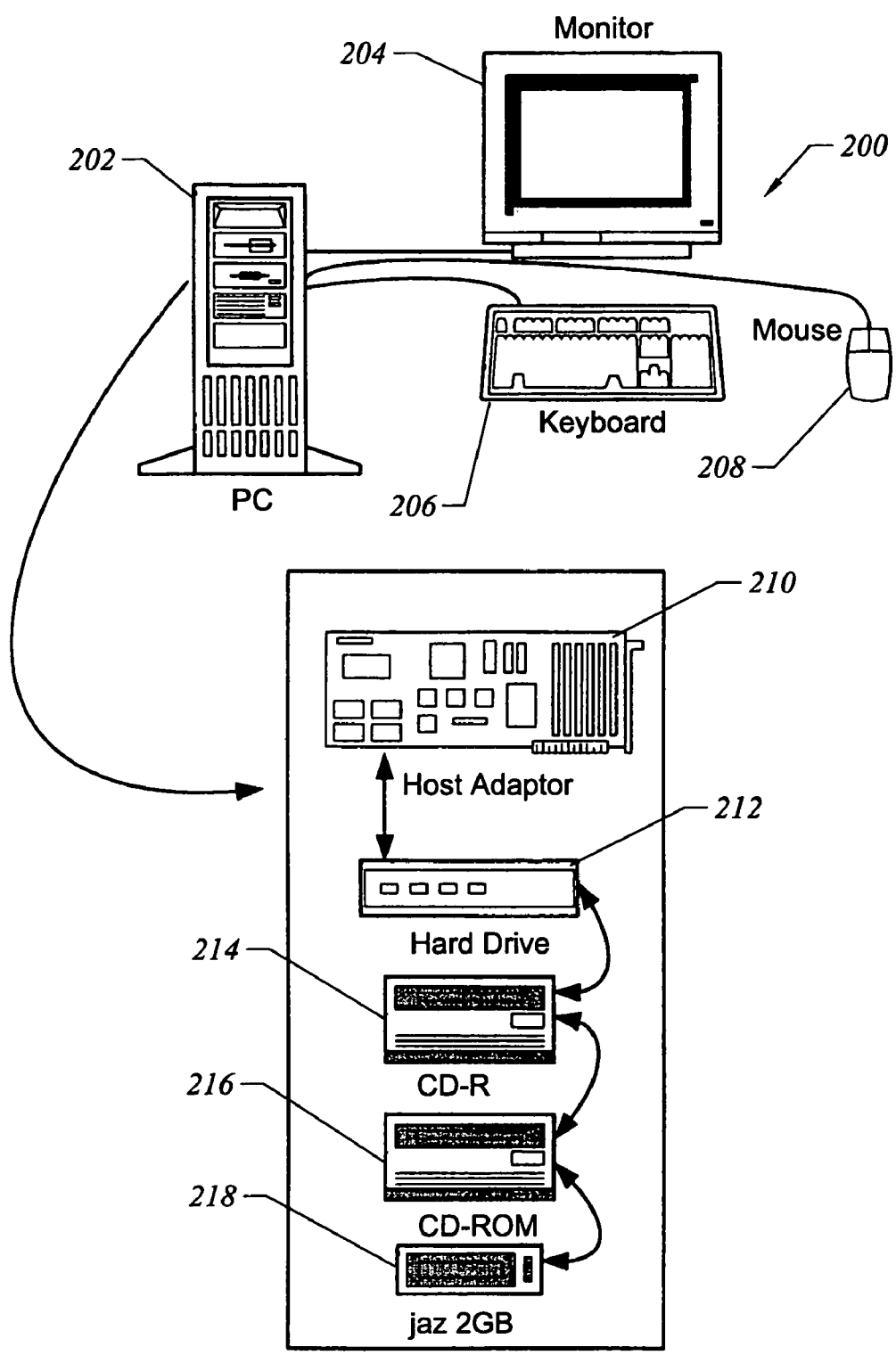
FIG. 1 is an exemplary computer system in accordance with one embodiment of the present invention.

An exemplary computer system 200 in accordance with one embodiment of the present invention is illustrated in FIG. 1. The computer system 200 includes a computer contained within a tower case 202, a display monitor 204, a keyboard 206 and a mouse 208. The computer contained within the tower case 202 includes a SCSI host adapter 210 with 4 connected peripheral devices. The peripheral devices include a hard drive 212, a CD-R optical media device 214, a CD-ROM optical media device 216, and a Jaz high volume storage device 218. The identified devices are representative of the many devices that might be connected to a computer, and should not be construed as all-encompassing or limiting. In one embodiment of the present invention, a SCSI host adapter 210 can provide connectivity for up to 30 peripheral devices to the computer system 200. Additional peripheral devices can include scanners, CD-R/W optical media devices, DVD drives, photographic devices, tape drives, and the like.

In a Windows® environment, access to edit and manage configuration settings of computer system 200 components is generally provided through a graphical user interface (GUI). By way of example, a display monitor 204 may provide for specialized settings for particular systems or applications, a mouse 208 can be adjusted for speed, sensitivity, or type of signal controlling mouse/cursor movement, and even keyboards 206 provide for configuration changes to include speed of character repeat, language used, and the like. In addition to device-specific configuration settings, system management of the devices allow for system configuration settings and management in the system utilization and processing of the various devices. System components can generally be accessed and settings or configuration can be changed and managed through such GUIs as My Computer, Control Panel, Windows® Explorer, Internet Explorer and the like.

Figure 2A:
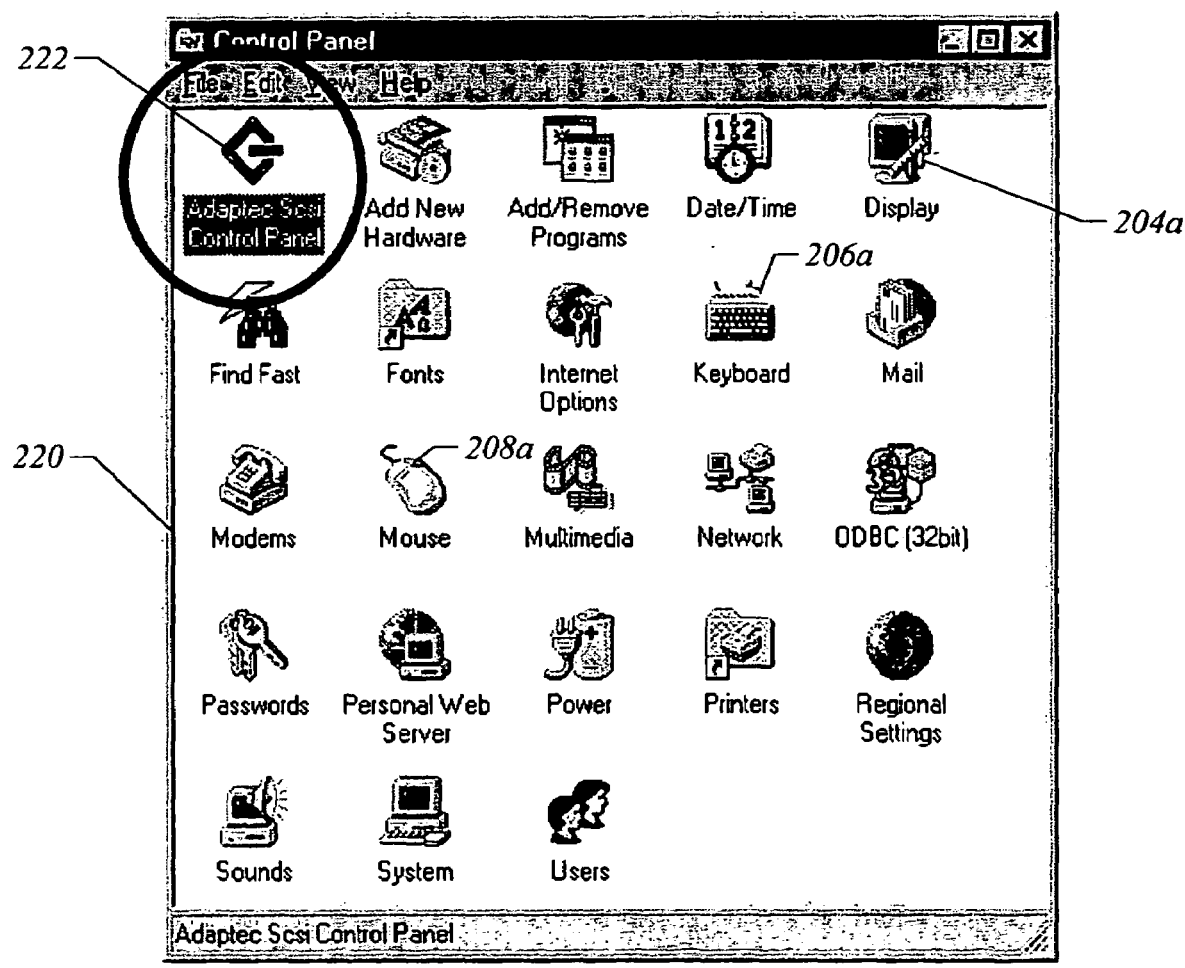
FIG. 2A is a screen shot of a Windows® Control Panel GUI in accordance with one embodiment of the present invention.

FIG. 2A is a screen shot of a Windows® Control Panel GUI 220 in accordance with one embodiment of the present invention. As is known, the Control Panel GUI 220 is one method to access system devices and configuration settings in the Windows® environment. Icons represent various system devices and parameters, and a user selects a particular icon to open a window or screen, another GUI, to access the configuration settings, parameters, and properties for the desired device or system parameter. In FIG. 2A, configuration settings and properties for the display monitor 204 (FIG. 1) are accessible by selecting the display icon 204a, the configuration settings and properties for the keyboard 206 (FIG. 1) are accessible by selecting the keyboard icon 206a, and the configuration settings and properties for the mouse 208 (FIG. 1) are accessible by selecting the mouse icon 208a.

Also illustrated and available for selection in the Control Panel GUI 220 illustrated in FIG. 2A is a SCSI Control Panel icon 222. As will be described in greater detail below, in one embodiment, the SCSI Control Panel icon 222 is one of several methods for a user to access the SCSI host adapter board 210 (FIG. 1) configuration settings and properties, as well as the configuration settings and properties of each of the peripheral devices attached to the selected SCSI host adapter 210 (FIG. 1). The SCSI Control panel provides such access to all SCSI host adapters that may be configured to the system. As can be seen in FIG. 2A, the SCSI Control Panel icon 222 in Control Panel 220 provides the graphical representation of the SCSI host adapter as simply another system device, accessible to a user just as the display 204a, mouse 208a, keyboard 206a, and the other illustrated icons are system components and accessible to the user.

Figure 2B:
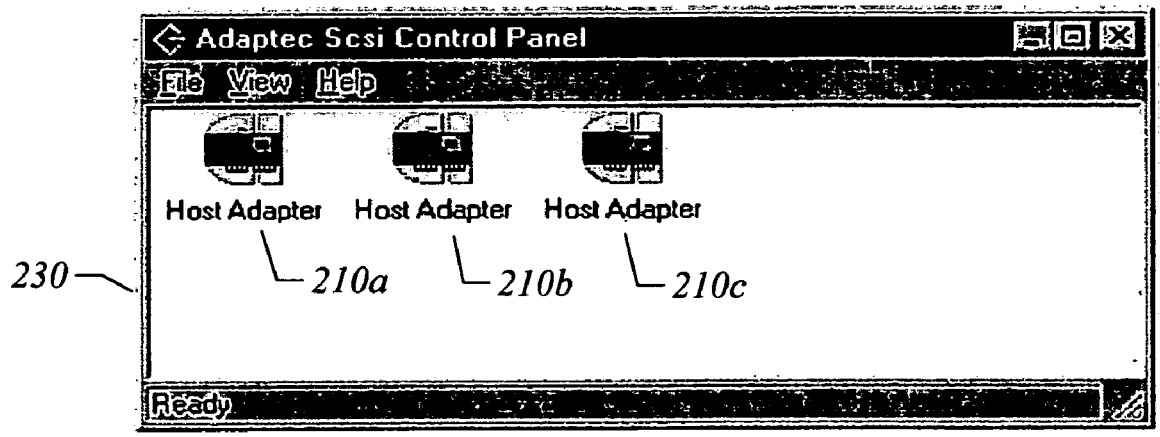
FIG. 2B shows the SCSI Control Panel GUI that results when the SCSI Control Panel icon is selected.

FIG. 2B shows the SCSI Control Panel GUI 230 that results when the SCSI Control Panel icon 222 (FIG. 2A) is selected. In FIG. 2B, the SCSI Control Panel GUI 230 indicates there are three SCSI host adapters 210a, 210b, 210c configured to the exemplary system illustrated in the Control Panel GUI 220 of FIG. 2A. By selecting the SCSI Control Panel icon 222 shown in FIG. 2A, the SCSI Control Panel GUI 230 shown in FIG. 2B is displayed. The SCSI Control Panel GUI 230 displays all SCSI host adapters configured to the system.

Figure 2C:
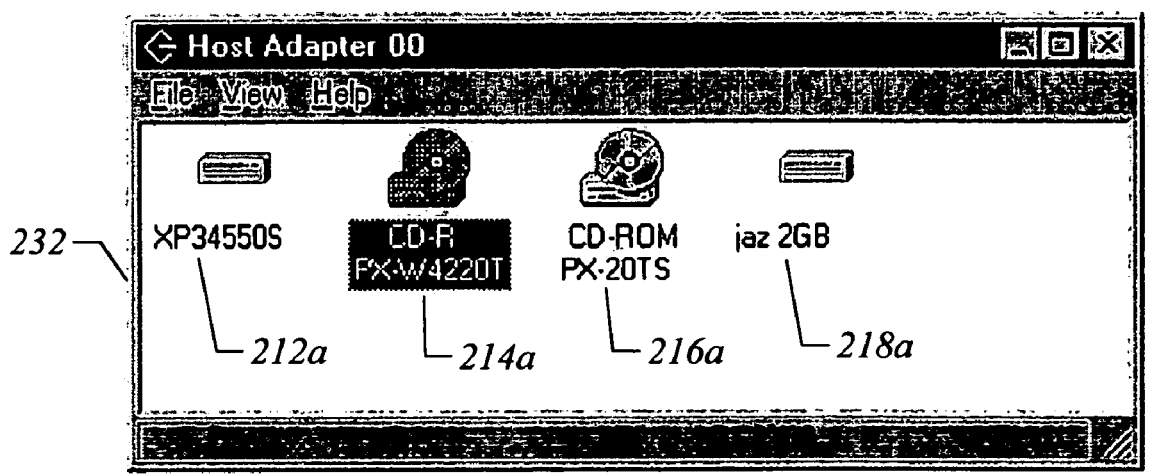
FIG. 2C shows the Host Adapter 00 GUI that results when Host Adapter 00 is selected in the SCSI Control Panel GUI shown in FIG. 2B.

FIG. 2C shows the Host Adapter 00 GUI 232 that results when Host Adapter 00 210a is selected in the SCSI Control Panel GUI 230 shown in FIG. 2B. The Host Adapter 00 GUI 232 is another Control Panel GUI showing the devices connected to the selected host adapter. In FIG. 2C, the user can see that a hard drive 212a, a CD-R optical device 214a, a CD-ROM optical device 216a, and a Jaz high volume storage device 218a are connected to the selected SCSI host adapter 210a (FIG. 2B). The displayed devices correspond to the exemplary computer system 200 illustrated in FIG. 1. As will be discussed in greater detail below, each of the devices displayed in the Host Adapter 00 GUI 232 can be selected to access and manage the configuration settings and properties for the device.

Figure 3A:
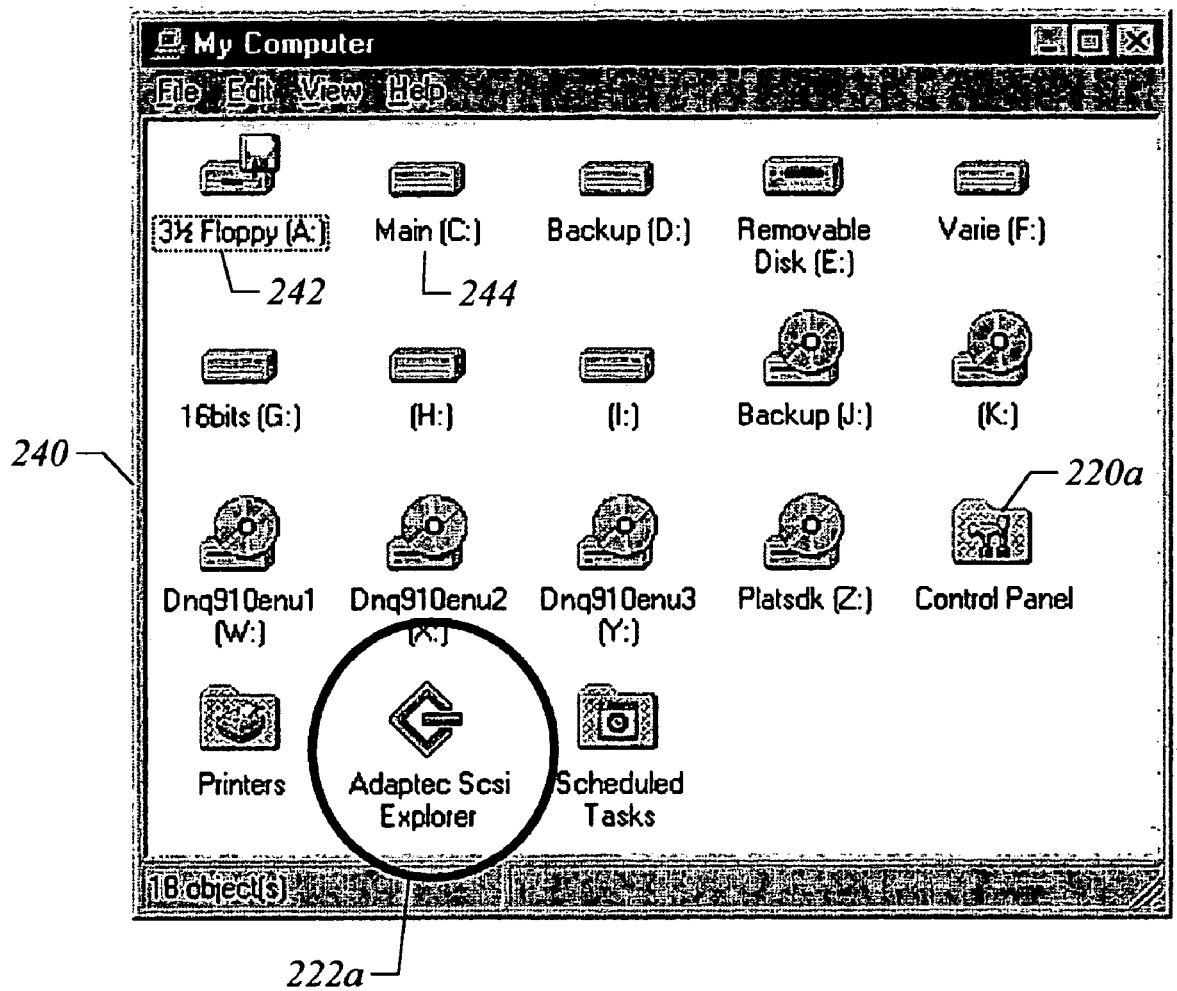
FIG. 3A illustrates the My Computer GUI in accordance with an embodiment of the invention.

As is known, the Windows® environment allows for a plurality of methods and modes of access to navigate and operate within the system. FIG. 3A illustrates the My Computer GUI 240 in accordance with an embodiment of the invention. The My Computer GUI 240 is an alternative means of navigating within the Windows® environment. Similar to the Control Panel GUI 220 (FIG. 2A), the My Computer GUI 240 provides a number of icons representing various regions and devices within the system. As shown in FIG. 3A, these regions and devices include drive A with a 3½ inch floppy disk drive 242, a drive C with a main hard drive 244, an icon leading to the Control Panel 220a as illustrated in FIG. 2A, and a SCSI Explorer icon 222a, among the various regions and devices available to a user for selection. By selecting the SCSI Explorer icon 222a, the user can navigate through additional GUIs similar to those GUIs described above in reference to FIGS. 2B and 2C to access and manage the configuration settings and properties of the selected host adapter and the peripheral devices attached to the host adapter. The SCSI Explorer icon 222a contained within the My Computer GUI 240 provides an alternative mode of access to the host adapter and connected peripheral devices, and provides a graphical representation of the host adapter as a system component accessible to the user.

Figure 3B:
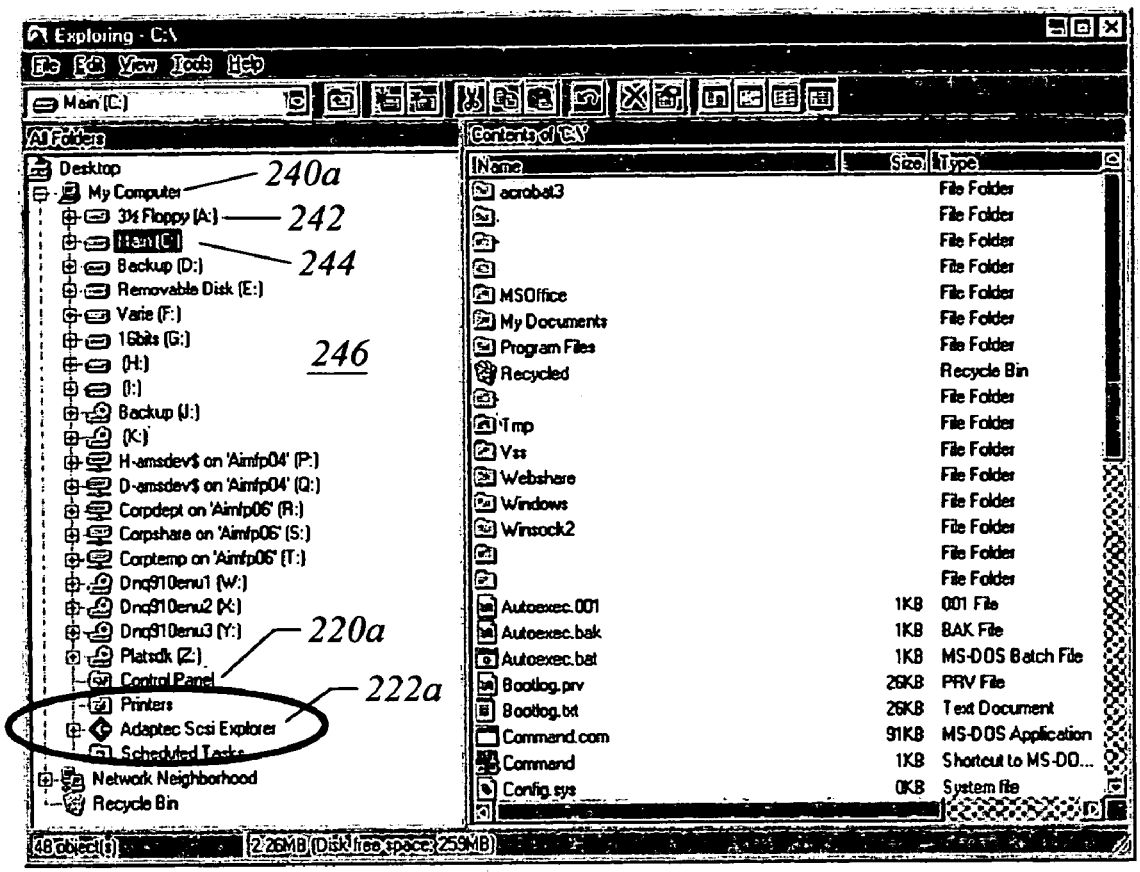
FIG. 3B illustrates yet another embodiment of the invention in which a SCSI Explorer icon is contained in and accessible through the Windows® Explorer GUI.

FIG. 3B illustrates yet another embodiment of the invention in which a SCSI Explorer icon 222a is contained in and accessible through the Windows® Explorer GUI 246. Windows® Explorer provides another method of navigating through the Windows® environment, and as can be seen in FIG. 3B, the Windows® Explorer GUI 246 includes icons for My Computer 240a, the 3½ inch Floppy on Drive A 242, the main hard drive on Drive C 244, the Control Panel 220a, the SCSI Explorer 222a, and other icons for the various drives, regions, and devices on the system. In one embodiment of the invention, the SCSI Explorer icon 222a is present and accessible in Windows® Explorer, and a user can navigate through the SCSI Explorer icon 222a to access the configured and attached host adapters, and the peripheral devices attached to the host adapters, to manage system and device configuration settings and properties.

Figure 3C:
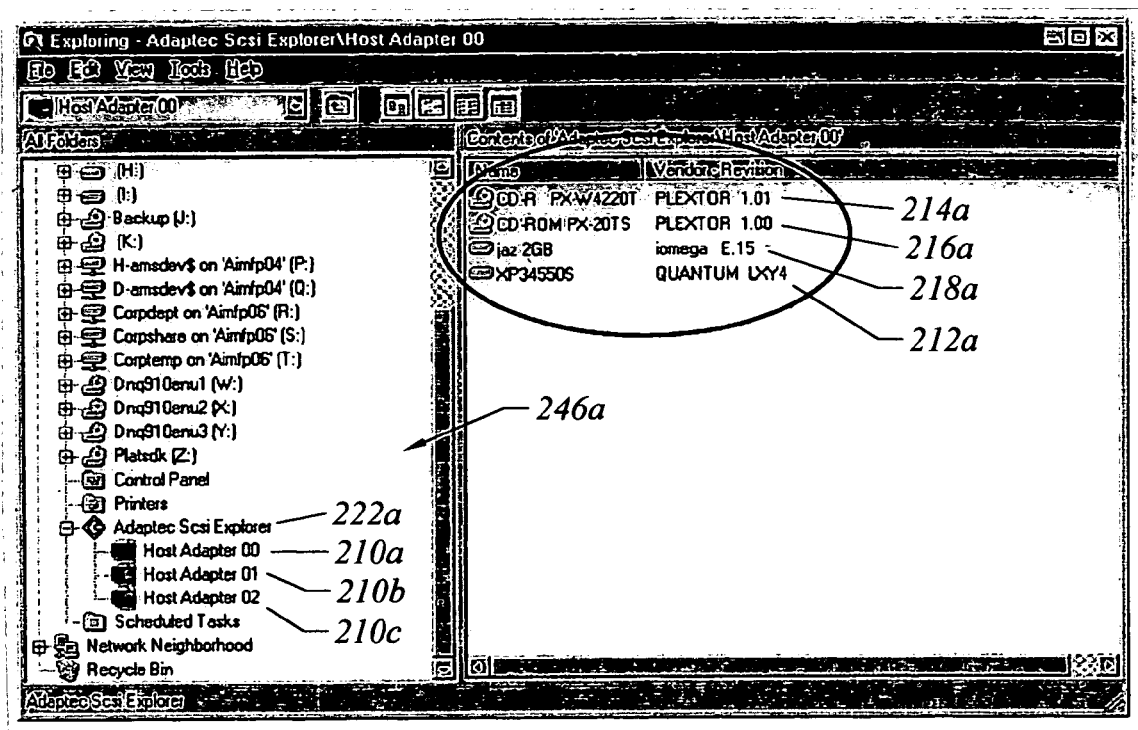
FIG. 3C shows the resulting Windows® Explorer GUI in accordance with one embodiment of the invention with the SCSI Explorer icon expanded to display the connected host adapters, and Host Adapter 00 selected.

FIG. 3C shows the resulting Windows® Explorer GUI 246a in accordance with one embodiment of the invention with the SCSI Explorer icon 222a expanded to display the connected host adapters 210a, 210b, 210c, and Host Adapter 00 210a selected. With Host Adapter 00 210a selected, the connected devices are visible in the right pane of the displayed Windows® Explorer GUI 246a. As in the previous Figures, Host Adapter 00 210a is configured with a CD-R optical media device 214a, a CD-ROM optical media device 216a, a Jaz high volume storage drive 218a, and a hard drive 212a. In accordance with an embodiment of the invention, each of the connected peripheral devices 214a, 216a, 218a, 212a, as well as each host adapter 210a, 210b, 210c, is accessible through the displayed Windows® Explorer GUI 246a, or through any of the GUIs described above in reference to FIGS. 2A through 3B. Navigation through any of the above-described GUIs, or through the GUIs described in reference to FIGS. 4A–4D below, allow a user to access, edit, and manage the configuration and properties settings for a host adapter and any peripheral device connected to the host adapter.

Figure 3D:
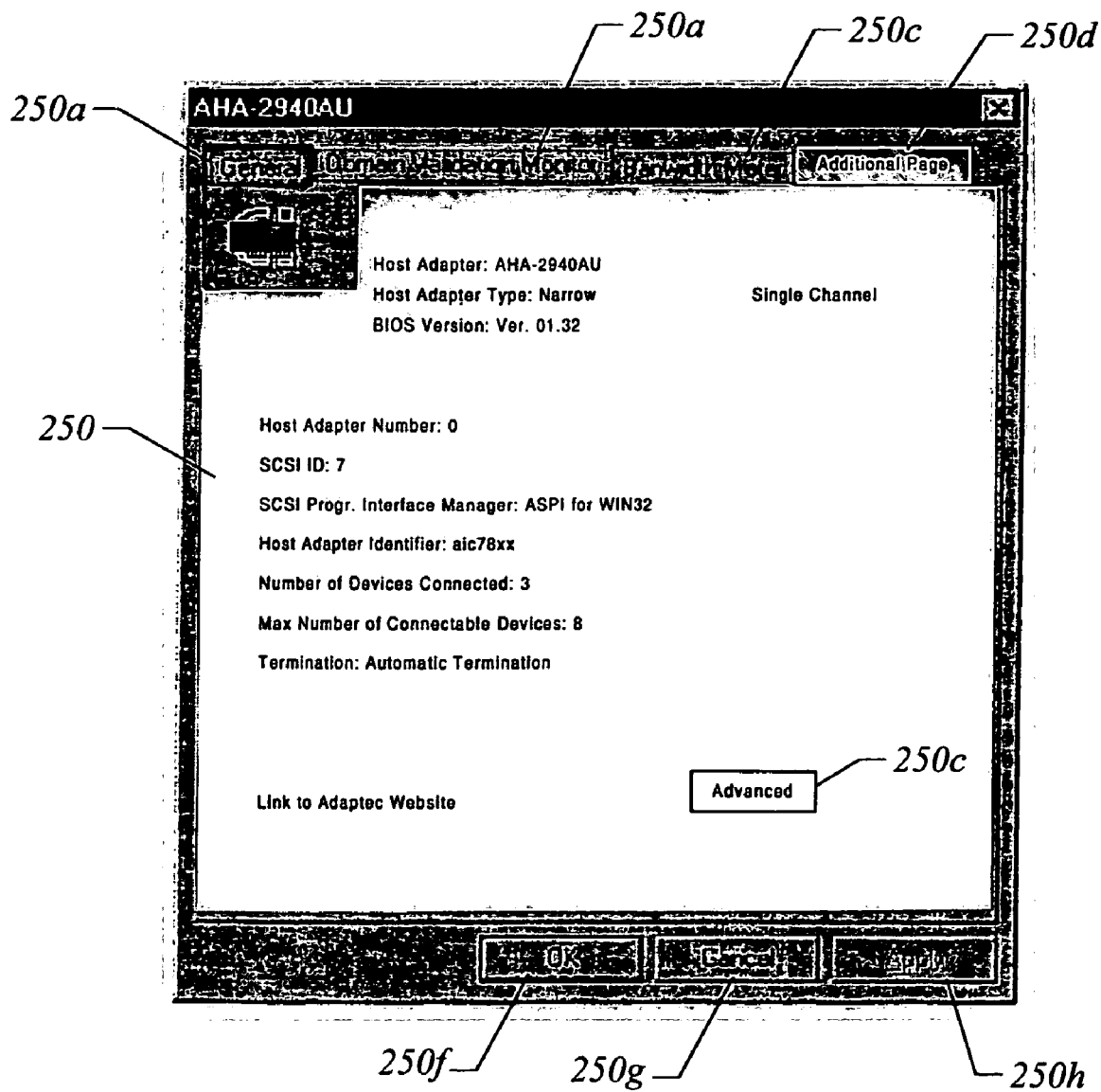
FIG. 3D illustrates a general properties GUI of Host Adapter 00.

Selection of the SCSI Explorer icon 222a in FIG. 3C allows a user to navigate to the properties and configuration GUIs for the host adapters 210a, 210b, 210c, and for the peripheral devices 214a, 216a, 218a, 212a. FIG. 3D illustrates a general properties GUI 250 of Host Adapter 00 210a (FIGS. 2B and 3C). Once a host adapter has been selected from any of the Windows® navigation GUIs as described above, a properties and configuration GUI for the selected host adapter is presented. In FIG. 3D, the properties and configuration GUI for Host Adapter 00 210a is represented with the general properties GUI 250 illustrated. A user can select from the tabs across the top of the GUI to display the general properties 250a, domain validation monitor 250b, bandwidth meter 250c, or any specialized additional pages 250d that may be present. By way of example, some host adapters have specialized features that may be accessed, in one embodiment of the invention, with the creation of additional pages 250d easily added to the properties and configuration GUI.

The general properties GUI 250 in FIG. 3D identifies the host adapter by model and type, host adapter number, SCSI identification number and host adapter identifier, and provides general information about the selected SCSI host adapter. The "Advanced" button 250c navigates a user to an additional configuration setting screen discussed in greater detail below in reference to FIG. 3G. The GUI further provides the standard Windows® settings selections of "OK" 250f, "Cancel" 250g, and "Apply" 250h. FIG. 3D illustrates that the host adapter operates similarly to most other system components that, once connected, provides the computer system with general properties and identifying information that is accessible in the general properties GUI 250.

Figure 3E:
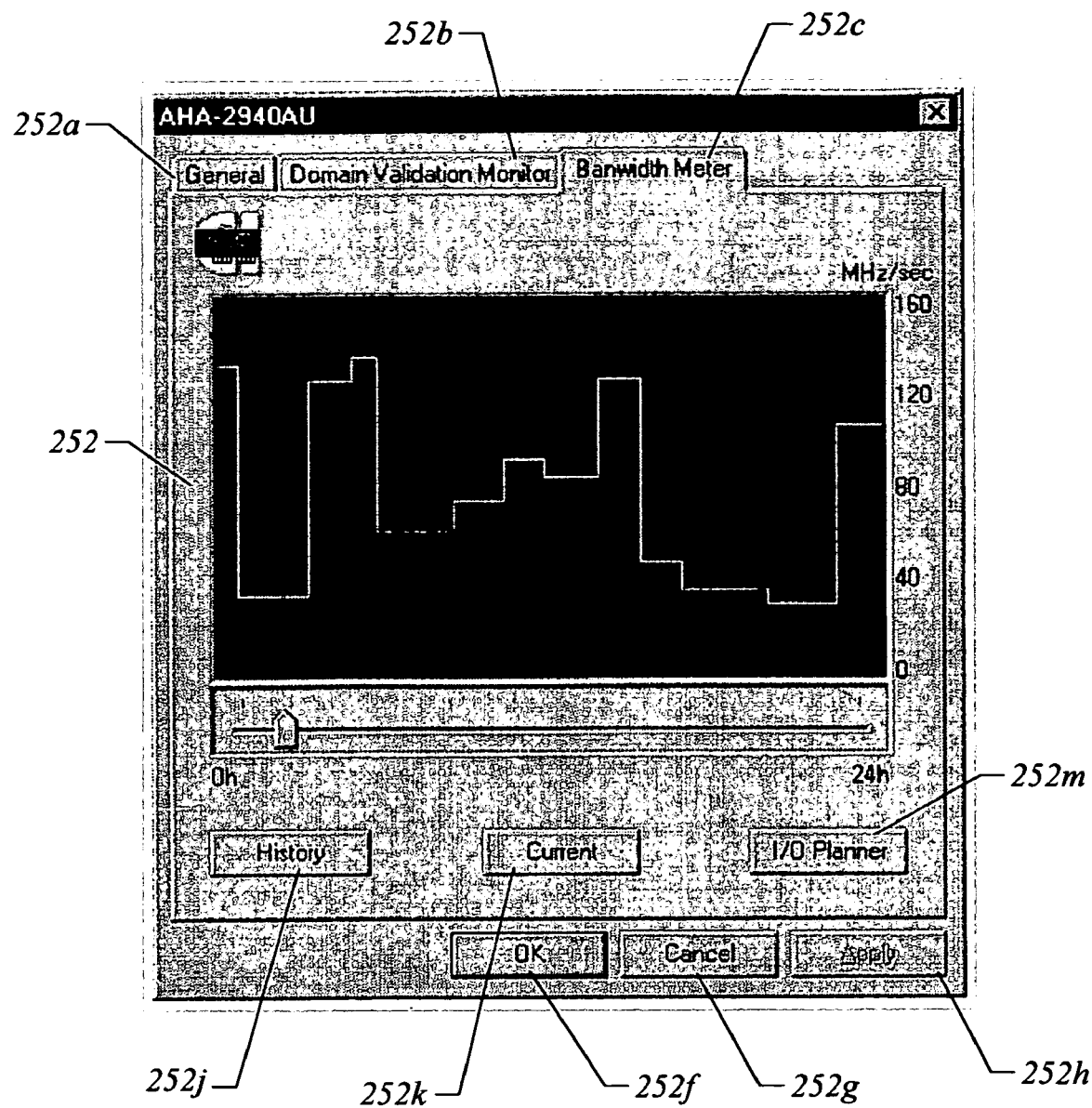
FIG. 3E shows the bandwidth meter GUI in accordance with one embodiment of the present invention.

FIG. 3E shows the bandwidth meter GUI 252 in accordance with one embodiment of the present invention. As shown, the bandwidth meter GUI 252 provides a graphical display of the bandwidth of the signal through the selected host adapter. The bandwidth meter GUI can be set to display the bandwidth of the signal currently through the selected host adapter by selecting the "Current" button 252k, or to display a graph of the bandwidth for a period of up to 24 hours by selecting the "History" button 252j. An "I/O Planner" button 252m is further included to provide a planning tool to enable a user to design a system configuration prior to installing the hardware. The I/O planner button 252 provides a simulation of host adapter and peripheral devices system performance for a desired number and type of host adapters and devices. By way of example, a user can select the I/O Planner button 252 and input specific host adapters and/or peripheral devices. The I/O Planner then graphically demonstrates a simulation of the system and host adapter overall performance with the configuration as provided by the user. The bandwidth meter GUI 252 can be used to monitor and evaluate the performance of a host adapter, for trouble-shooting, and is accessed by selecting the bandwidth meter tab 252c at the top of the GUI as described above in reference to FIG. 3D.

Figure 3F:
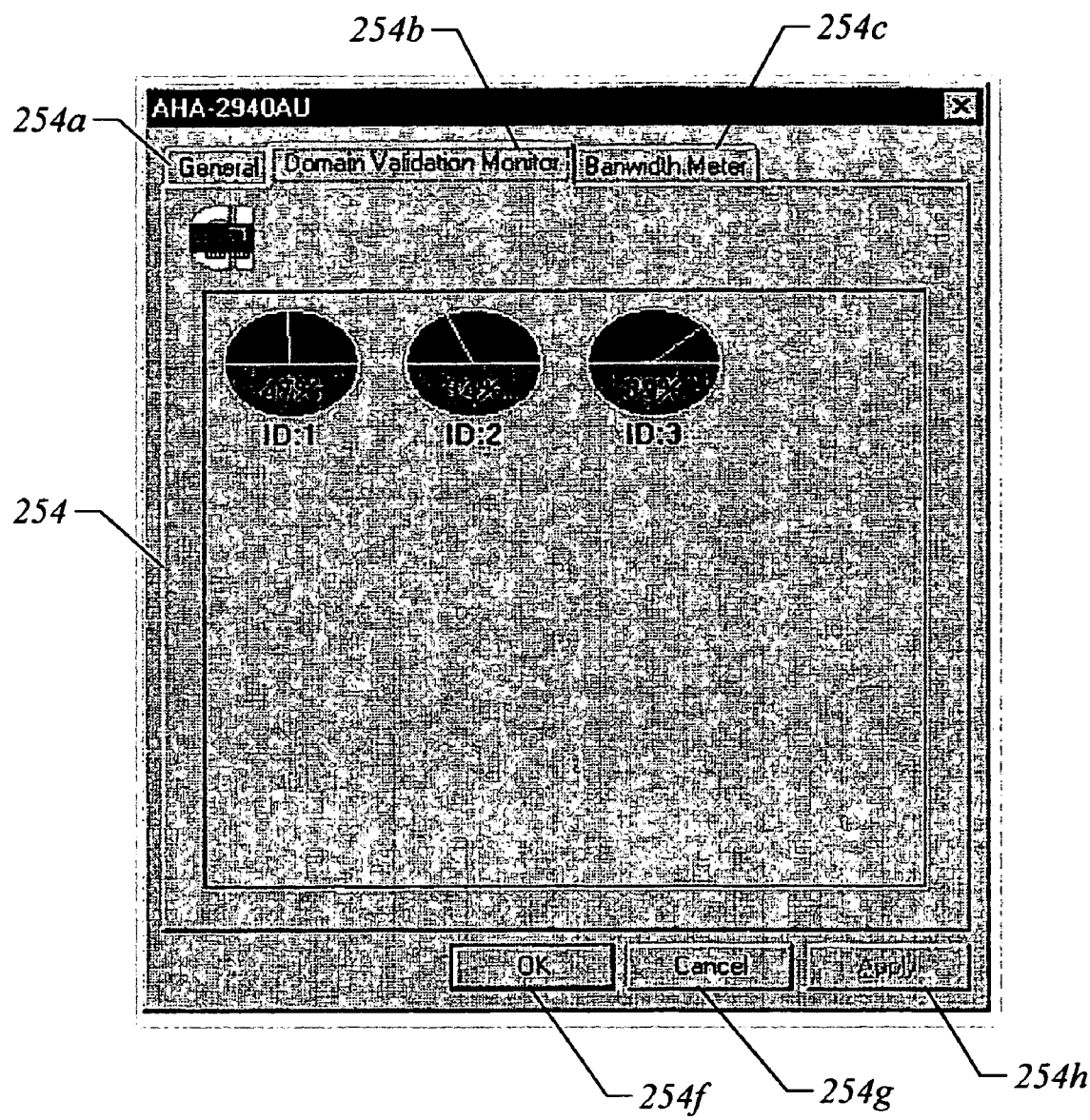
FIG. 3F is a domain validation monitor GUI in accordance with one embodiment of the present invention.

FIG. 3F is a domain validation monitor GUI 254 in accordance with one embodiment of the present invention. Each time a peripheral device is attached to a host adapter, the host adapter optimizes the peripheral device performance based on available bandwidth to the host adapter and the capacity of the peripheral device. The domain validation monitor GUI 254 provides a visual monitor of device performance in accordance with one embodiment of the present invention, and can be used to verify the device is performing as advertised, or to trouble-shoot performance issues of devices connected to selected host adapters. The domain validation monitor GUI 254 is accessible by selecting the domain validation monitor tab 254b at the top of the GUI as described in reference to FIG. 3D.

Figure 3G:
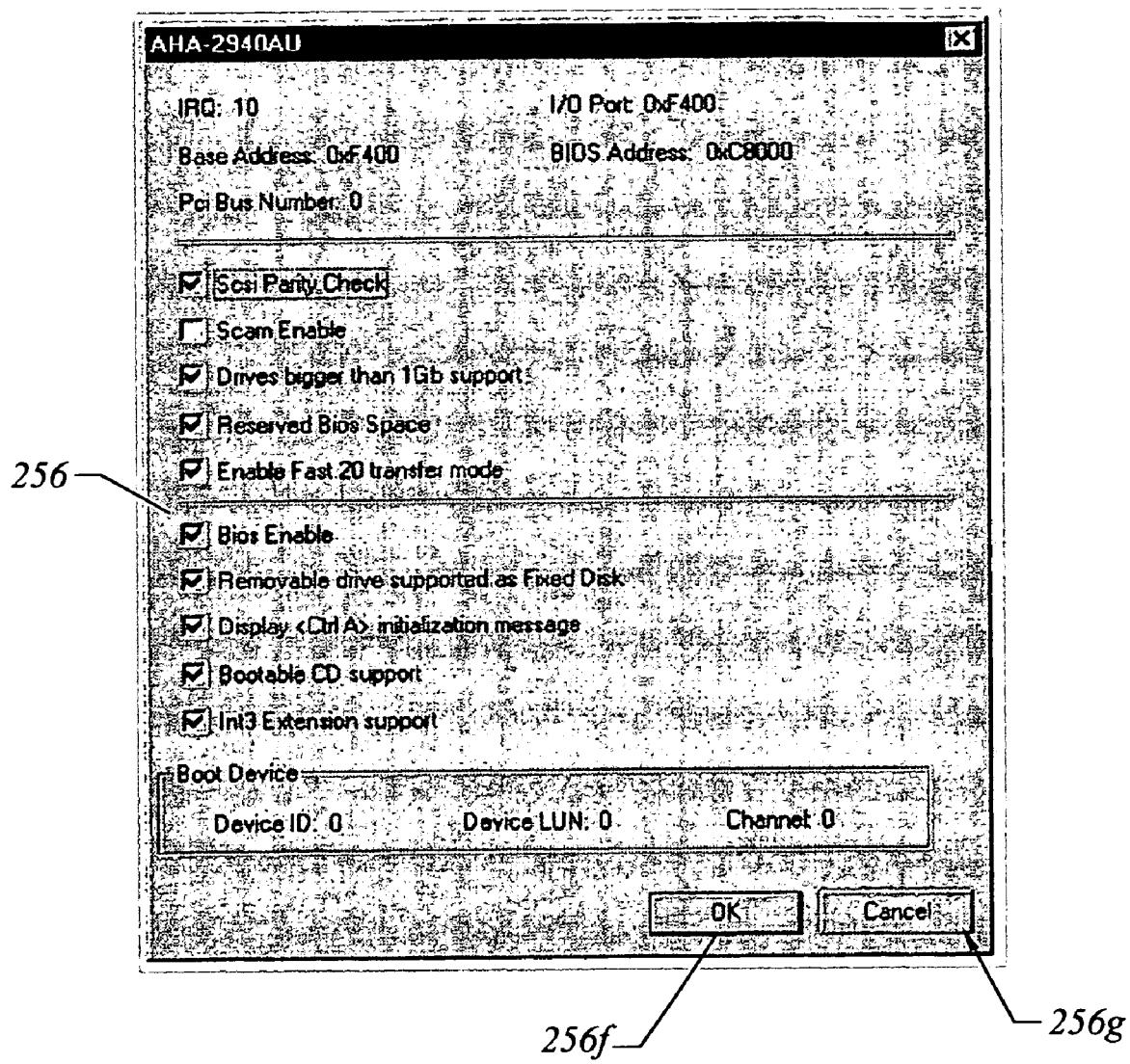
FIG. 3G shows the advanced configuration settings GUI in accordance with one embodiment of the invention.

FIG. 3G shows the advanced configuration settings GUI 256 in accordance with one embodiment of the invention. When a user selects the "Advanced" button on the general properties GUI 250 in FIG. 3D, the advanced configuration settings GUI 256 is presented as shown in FIG. 3G. Through the advanced configuration settings GUI 256, a user can select from the various configuration settings as shown in FIG. 3G. The available configuration settings are utilized to configure the actual host adapter board while in the Windows® environment. The settings displayed and configurable through the advanced configuration settings GUI 256 include those settings that in prior art are only accessible through the system BIOS, but in one embodiment of the present invention, the host adapter settings can be configured while operating in Windows®. The method of configuring the host adapter and attached peripheral devices is described more fully below in reference to FIGS. 6 and 7. One embodiment of the present invention provides an advanced configuration settings GUI 256 as illustrated in FIG. 3G, allowing a user to select and configure a host adapter while in a Windows® environment just as a user can select and configure the various system components as illustrated in FIGS. 2A, 3A, and 3B.

Figure 3H:
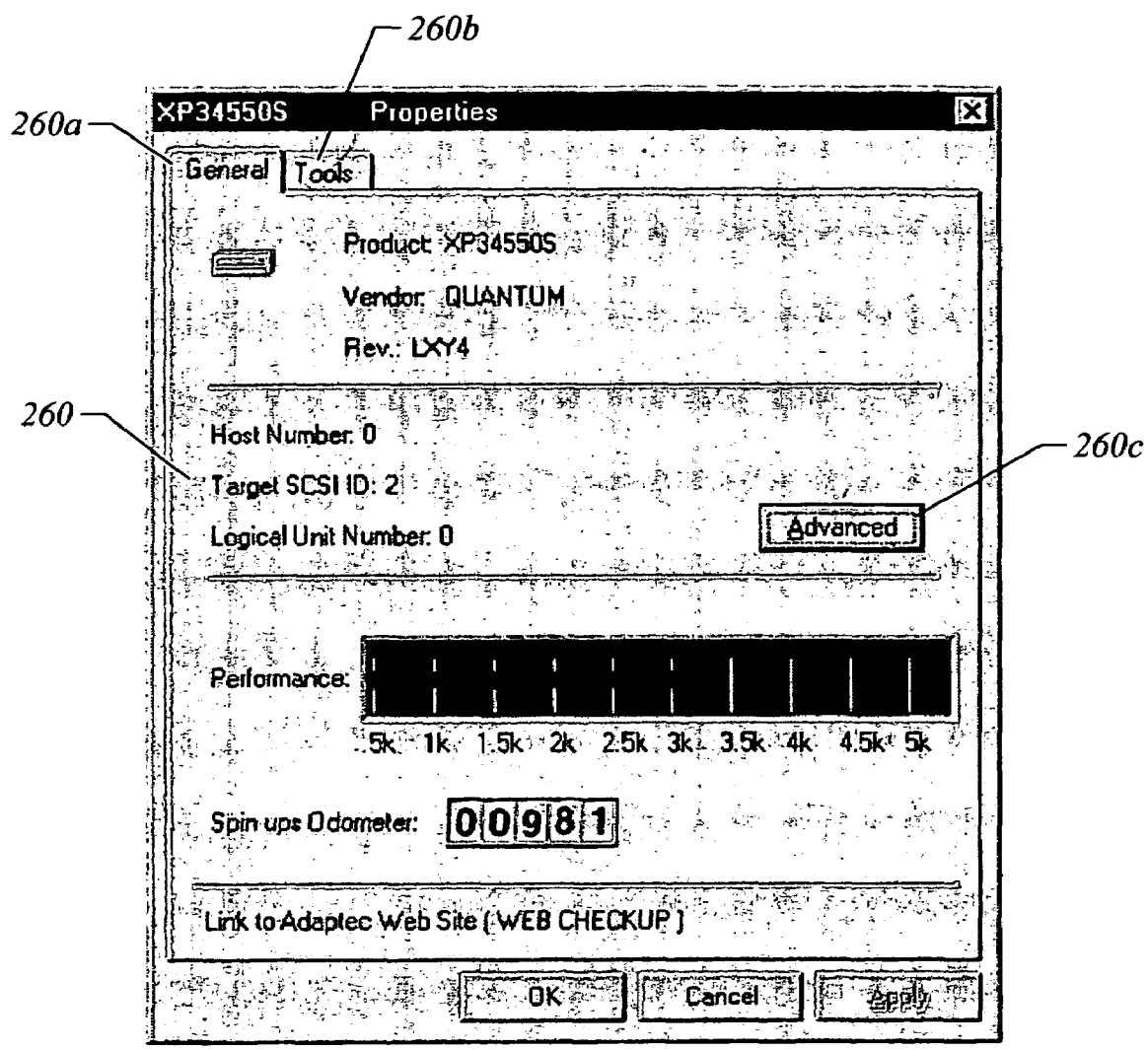
FIG. 3H shows a properties GUI for the hard drive connected to the host adapter shown in FIG. 1.
Figure 3I:
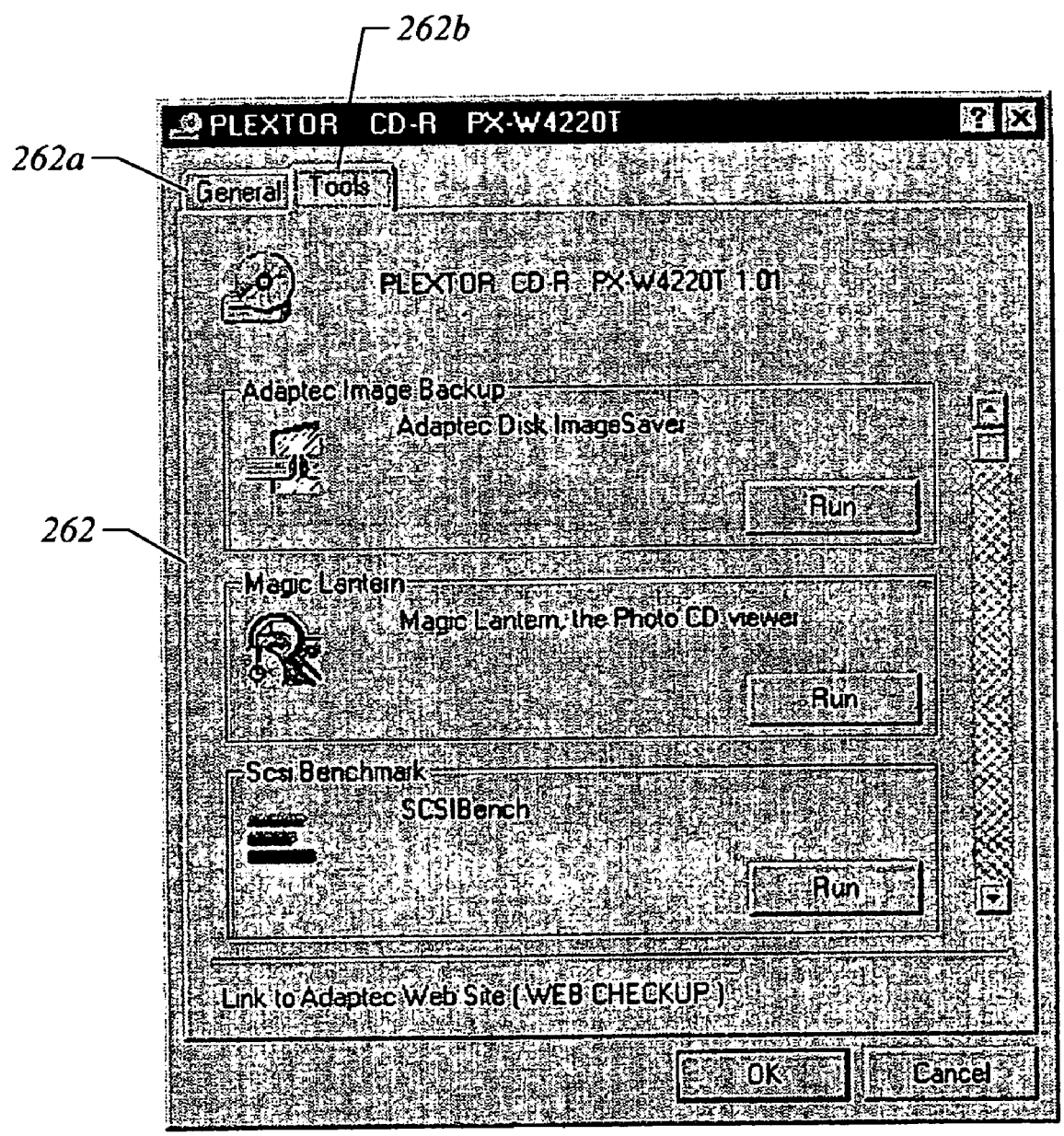
FIG. 3I shows a properties GUI for the CD-R optical device connected to the host adapter shown in FIG. 1.

FIGS. 3H and 3I show configuration GUIs for peripheral devices connected to a host adapter in accordance with one embodiment of the present invention. One embodiment of the present invention provides for accessing, configuration, and management of peripheral devices connected to a SCSI host adapter, in addition to the host adapter itself. FIG. 3H shows a properties GUI 260 for the hard drive 212 connected to the host adapter 210 shown in FIG. 1. The illustrated embodiment of the properties GUI 260 contains two pages or screens, GUIs, selectable from tabs 260a, 260b at the top of the properties GUI 260. In the hard drive example of FIG. 3H, the general properties screen is displayed with device and performance information thereon. An "Advanced" properties 260c button is noted providing access to the system and device configuration settings for the hard drive, similar to the system and configuration settings described above in reference to the host adapter in FIG. 3G.

FIG. 3I shows a properties GUI 262 for the CD-R optical device 214 connected to the host adapter 210 shown in FIG. 1. The embodiment of the CD-R optical device properties GUI 262 in FIG. 3I is similar to the properties GUI 260 described in FIG. 3H. In FIG. 3I, the CD-R properties GUI 262 is the "Tools" GUI obtained by selecting the Tools tab 262b at the top of the screen. The "Tools" GUI 262 provides access to a plurality of utility software routines that utilize the various peripheral devices attached to the host adapter.

Figure 4A:
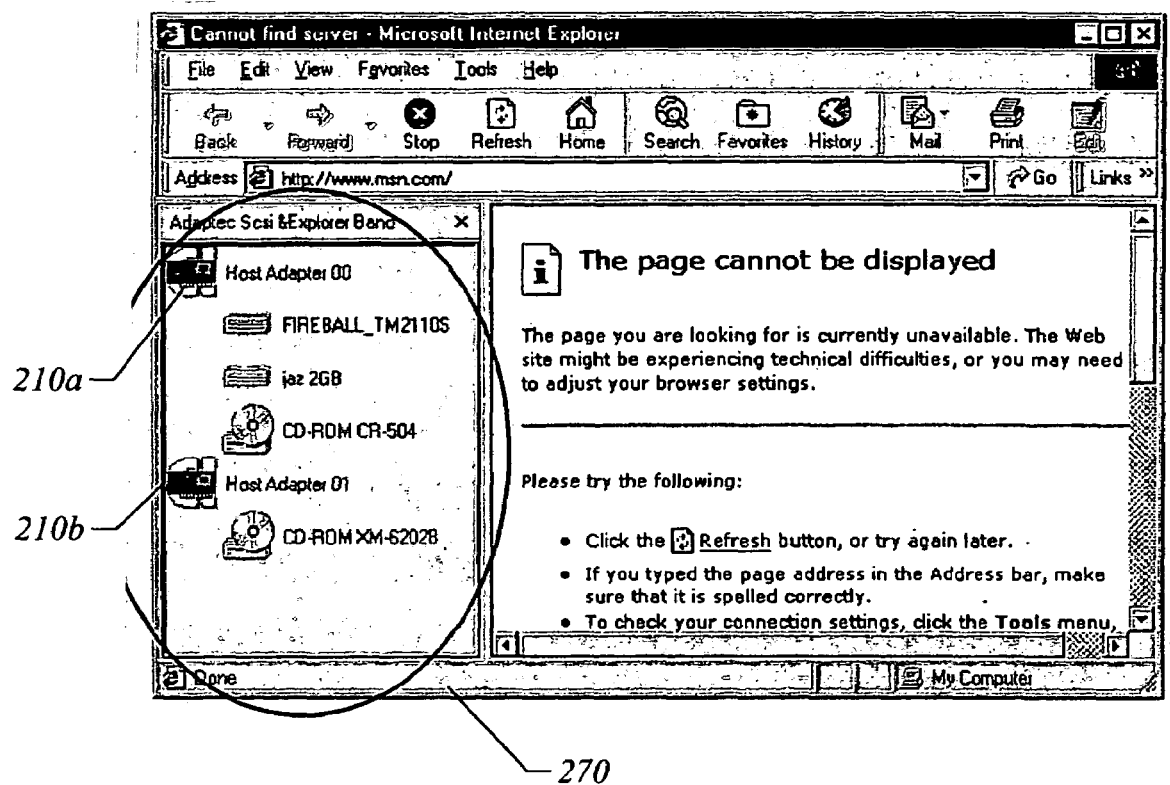
FIG. 4A illustrates an Internet Explorer GUI in accordance with another embodiment of the present invention.
Figure 4B:
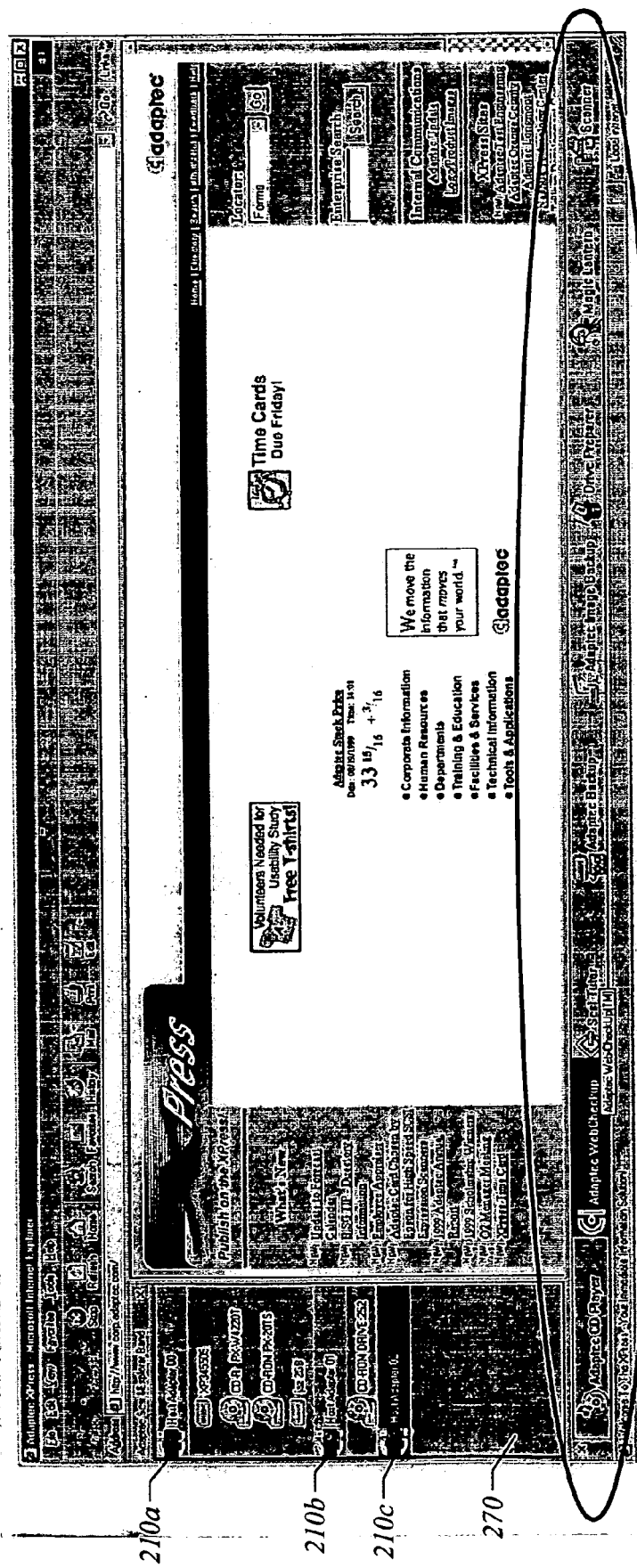
FIG. 4B shows the Internet Explorer GUI connected through the World Wide Web to a manufacturer website in accordance with an embodiment of the invention.

FIG. 4A illustrates an Internet Explorer GUI 270 in accordance with another embodiment of the present invention. Yet another method of navigating the Windows® environment is with Internet Explorer. FIG. 4A shows the Internet Explorer GUI 270. As is known, computer system navigation in the Windows® environment can be enhanced by using Internet Explorer to interact with a remote system across the World Wide Web. In FIG. 4A, system host adapters 210a, 210b are visible on the left side of the Internet Explorer GUI 270. In FIG. 4B, the Internet Explorer GUI 270 is shown connected through the World Wide Web to a manufacturer website. Host adapters 210a, 210b, 210c remain visible and selectable along the left side of the Internet Explorer GUI 270. An Internet Explorer Band 275 is shown expanded across the bottom of the Internet Explorer GUI 270, with additional applications and tools available for selection that are configured to access, manage, utilize devices connected to the installed host adapters. The Internet Explorer Band 275 provides yet another method of navigating through the plurality of GUIs available to access and manage the host adapters 210a, 210b, 210c as described in detail above with reference to FIGS. 2A–3I.

Figure 4C:
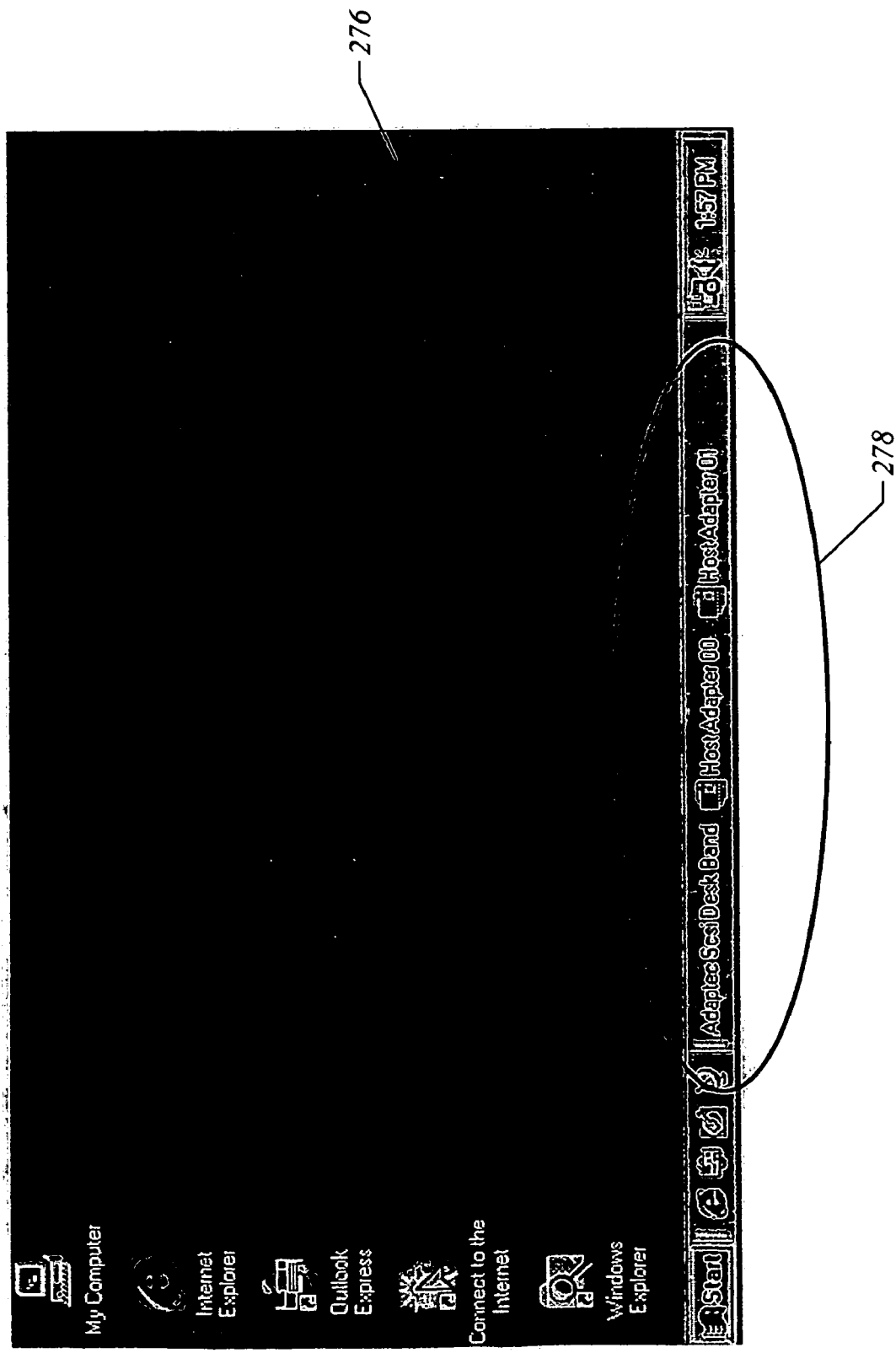
FIG. 4C shows the desk band across the bottom of the Windows® desktop in accordance with one embodiment of the invention.
Figure 4D:
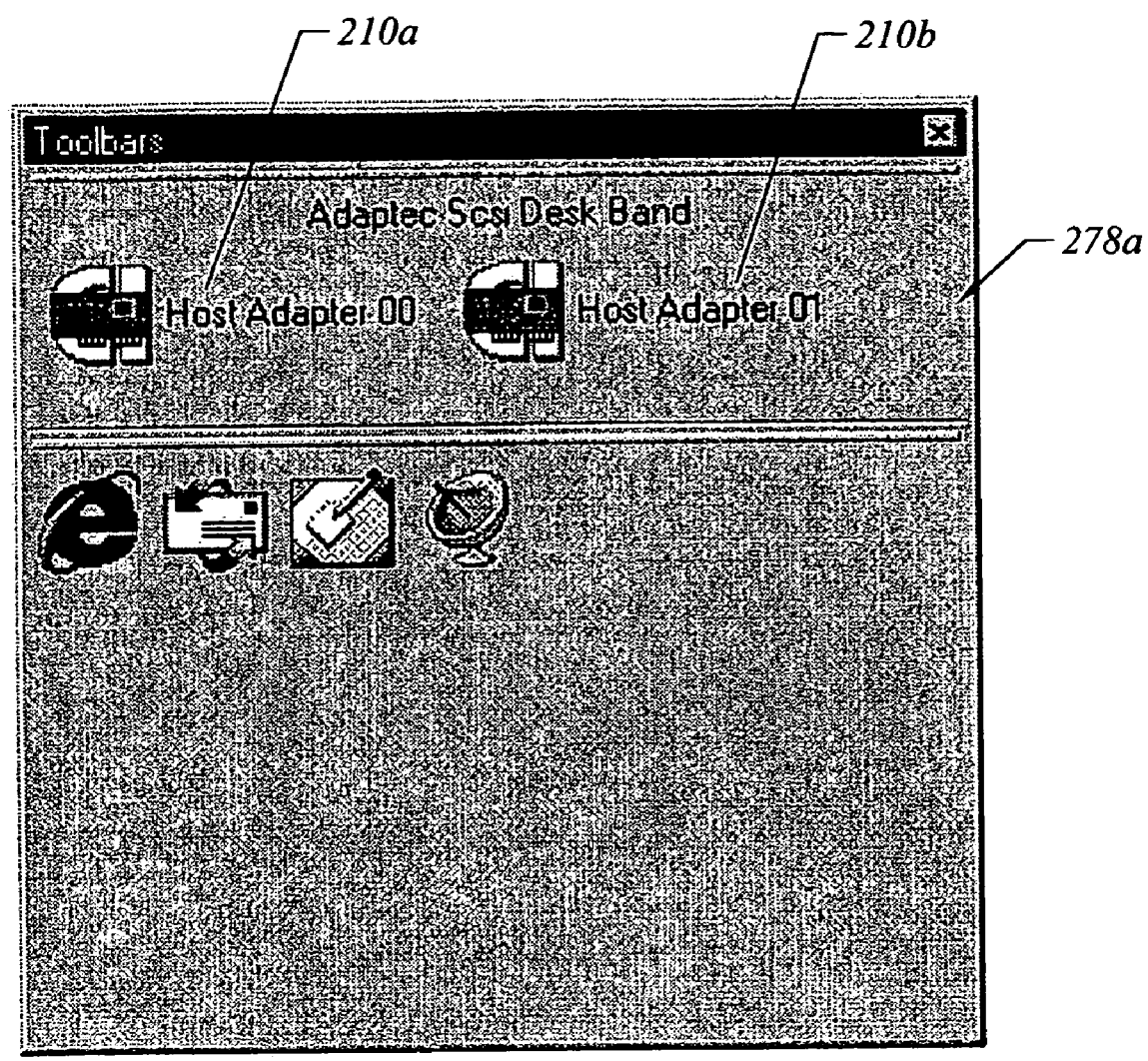
FIG. 4D shows an alternative embodiment of displaying the desk band as a tool bar in the Windows® environment.

FIGS. 4C and 4D further illustrate the desk band 278, 278a in accordance with an embodiment of the invention. The desk band 278, 278a correlates to the Internet Explorer Desk Band 275 (FIG. 4B), without the Internet Explorer GUI 270 (FIGS. 4A–4B) open. In FIG. 4C, the desk band 278 is shown across the bottom of the Windows® desktop. As described above, the desk band 278 provides another method of navigating to the host adapter GUIs. FIG. 4D shows an alternative method of displaying the desk band 278a as a tool bar in the Windows® environment.

Figure 5:
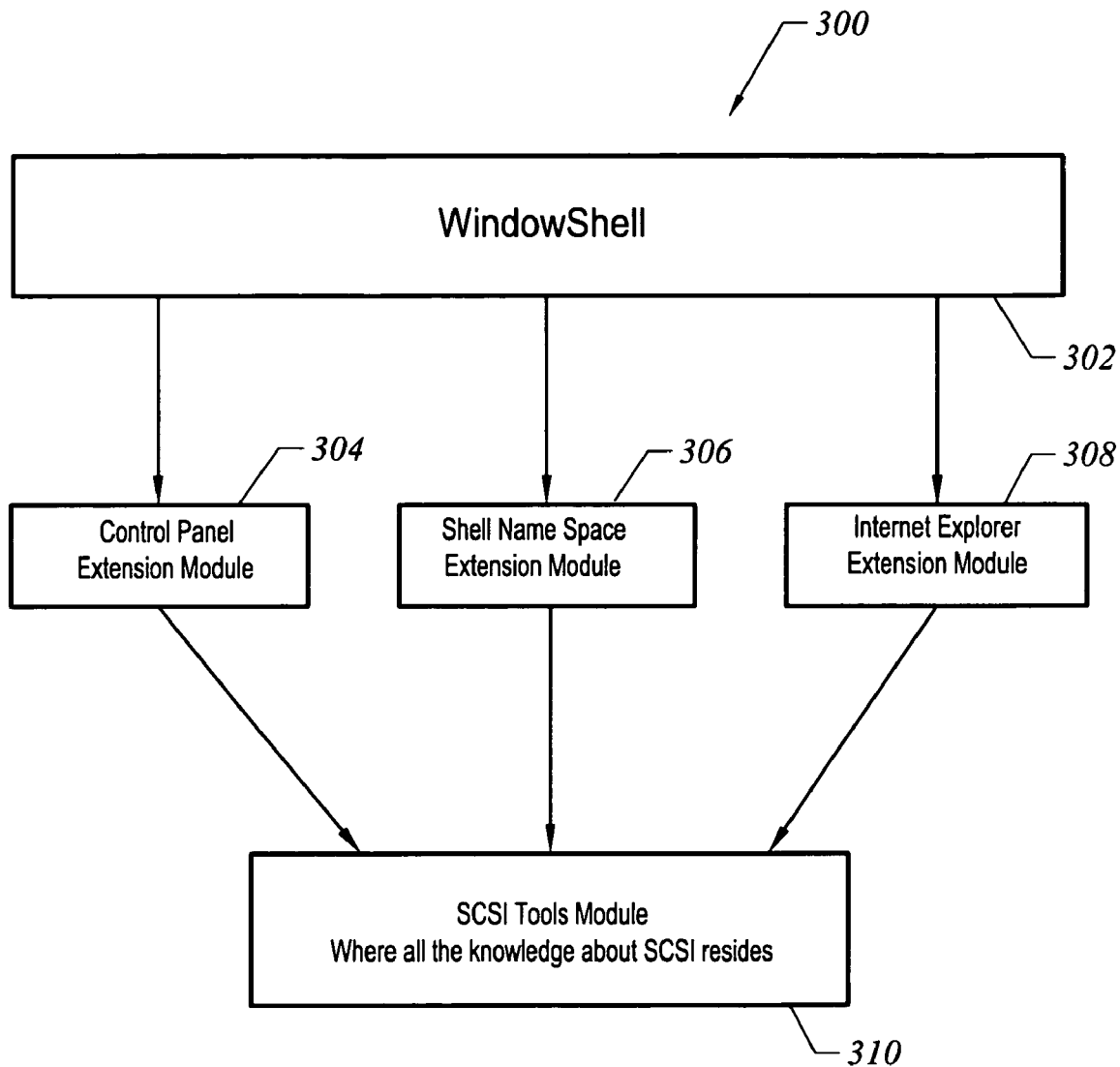
FIG. 5 shows a system diagram of the routes for accessing, configuring, managing, and monitoring the host adapter in accordance with one embodiment of the present invention.

FIG. 5 shows a system diagram 300 of the above-described routes for accessing, configuring, managing, and monitoring the host adapter in accordance with one embodiment of the present invention. The present invention provides access to a host adapter through the Windows® environment in one embodiment, and the WindowShell block 302 at the top of the system diagram 300 represents the Windows® operating system as the route to host adapter access. As described in detail above, the Windows® environment provides a plurality of methods of navigation within the operating system, and the second tier of the system diagram 300 identifies three methods that can be used to access the host adapter. Block 304 is the control panel extension module and includes the control panel GUI 220 as described above in reference to FIG. 2A. Block 306 is the shell name space extension module and includes the my computer GUI 240 as described above in reference to FIG. 3A and the Windows® Explorer GUI 246 as described above in reference to FIG. 3B. The internet explorer extension module block 308 includes the internet explorer GUI 270 as described above in reference to FIG. 4A, and the desk bands 275, 278, 278a illustrated in FIGS. 4B, 4C and 4D respectively.

Each of the blocks 304, 306 and 308 represent a different navigation method within the Windows® operating system shell, and either or all will provide a user access to the SCSI tools module block 310 in accordance with one embodiment of the invention. The SCSI tools module block 310 represents all of the configuration, properties, and utilities GUIs described above in reference to FIGS. 3D–3I. The GUIs provide for user access, management, monitoring, configuration, modification, and meaningful use of host adapters and connected peripheral devices within the Windows® environment. The GUIs present host adapters and connected peripheral devices as additional computer system components with the look, feel, and implementation of integral system components. Methods of use of the invention are described in greater detail below in reference to FIGS. 6 and 7.

Figure 6:
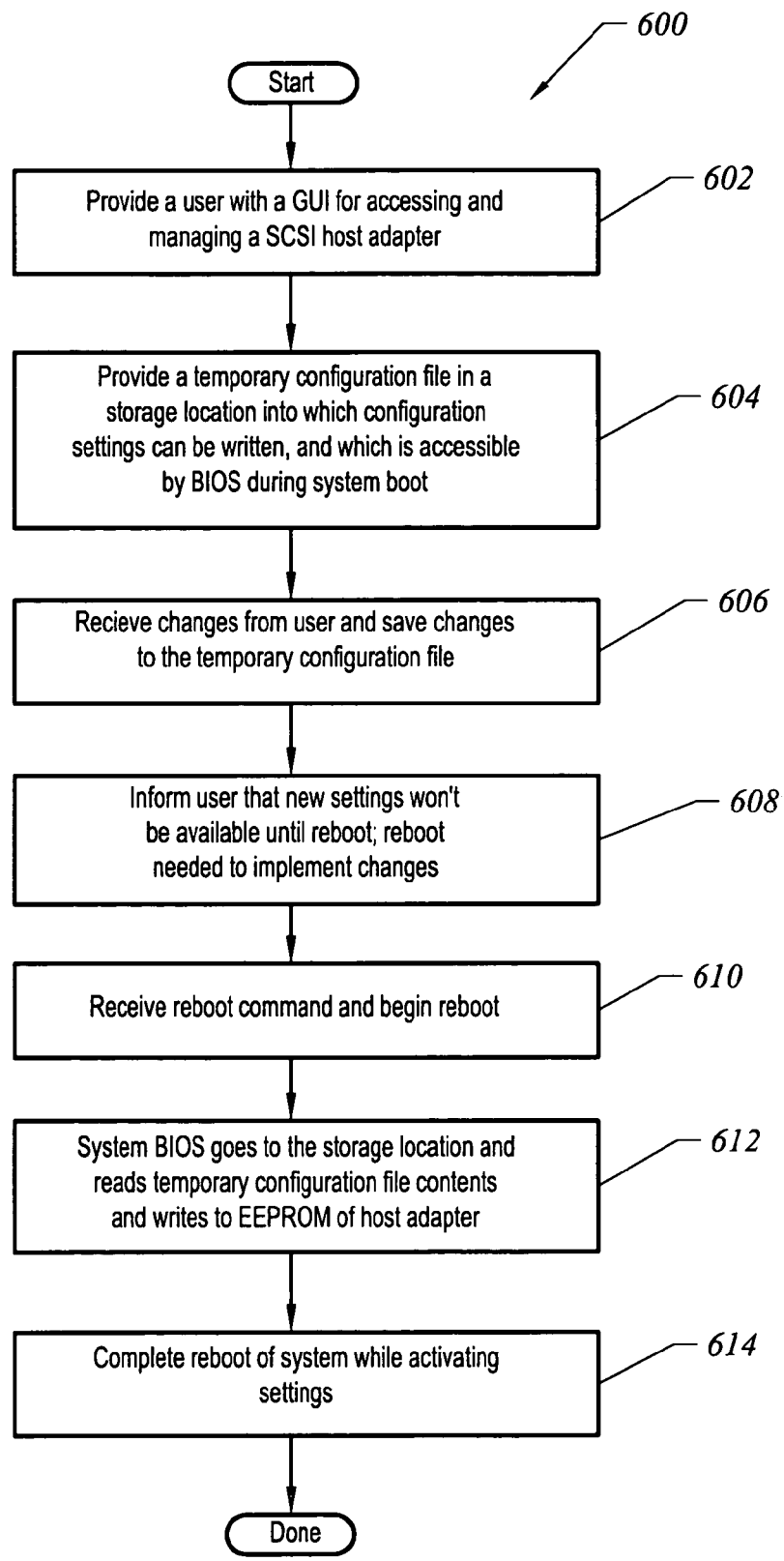
FIG. 6 is a flowchart diagram of the method operations performed for accessing and making changes to a host adapter in accordance with one embodiment of the present invention.

FIG. 6 is a flowchart diagram 600 of the method operations performed for accessing and making changes to a host adapter in accordance with one embodiment of the present invention. The method begins with operation 602 in which a user is provided with a GUI that enables access to configuration data of a host adapter. The GUI exists and operates within the Windows® environment. Examples of such GUIs include My Computer, Control Panel, Windows® Explorer, Internet Explorer, and the like. As is known, when device configuration is accomplished through the system BIOS, it is accomplished by use of BIOS-level screens, text-only user interface. The user interface provided in operation 602 is a GUI that exists and operates within the Windows® operating system. The Graphical User Interface is known to be much more immediate and easier to use than older text-only User Interface.

The method continues with operation 604 in which a temporary configuration file is provided. When changes are made to a host adapter, the host adapter cannot be actively processing data from peripheral devices or the system. Desired configuration or settings changes are therefore written to a configuration file in a storage location that is accessible to the BIOS during system boot. The storage location can be one of a location on a hard drive, some memory on the mother board, and some memory on the host adapter. By way of example, the storage location might be a memory chip configured to receive the host adapter changes and identified by the BIOS to be read for any configuration changes. During the boot operation, the system is initially configured by the BIOS, and in one embodiment of the present invention, the BIOS reads the desired host adapter configuration settings during the boot sequence from the temporary configuration file in a storage location as provided in operation 604.

The method proceeds with operation 606 in which host adapter configuration or settings changes are received from a user, and the changes are written to the temporary configuration file. By way of example, the user can navigate through any of the above described GUIs to a host adapter advanced settings GUI. The user selects desired host adapter settings, and then saves the settings. When the settings are saved, they are written to the temporary configuration file.

The method then advances to operation 608 where the user is informed that the new settings will not be available until reboot. As described above, the configuration of a host adapter cannot be changed while the host adapter is processing data, or any of the connected peripheral devices are active and processing data. In operation 608, the user is prompted that a reboot is necessary to implement the requested changes and, in one embodiment, provides the user with a prompt to initiate a reboot.

In operation 610, the reboot command is received, and the reboot is initiated. By way of example, the user might be provided with a system query to initiate reboot. If the user selects "Yes," the reboot command is received and executed. As is known, the system then initiates a shut down of all system devices, including a final processing of any active data. The system shuts down all peripheral devices, the Windows® operating system, and begins system initialization with the BIOS.

Next, in operation 612, the system BIOS executes the boot sequence. During the boot sequence, the system BIOS goes to the storage location and reads the temporary configuration file provided in operation 604. The configuration settings for the host adapter that were written to the temporary configuration file are then written to the EEPROM of the host adapter.

Finally, in operation 614, the system reboot is completed with the new settings activated. It should therefore be understood that new configuration settings are not activated until the system is rebooted in operation 614. Therefore, the configuration settings are not activated at the time the user makes the changes and the changes are saved to the temporary configuration file in operation 606. Upon reboot, the system is initialized in accordance with the new settings, and the method is done.

Figure 7:
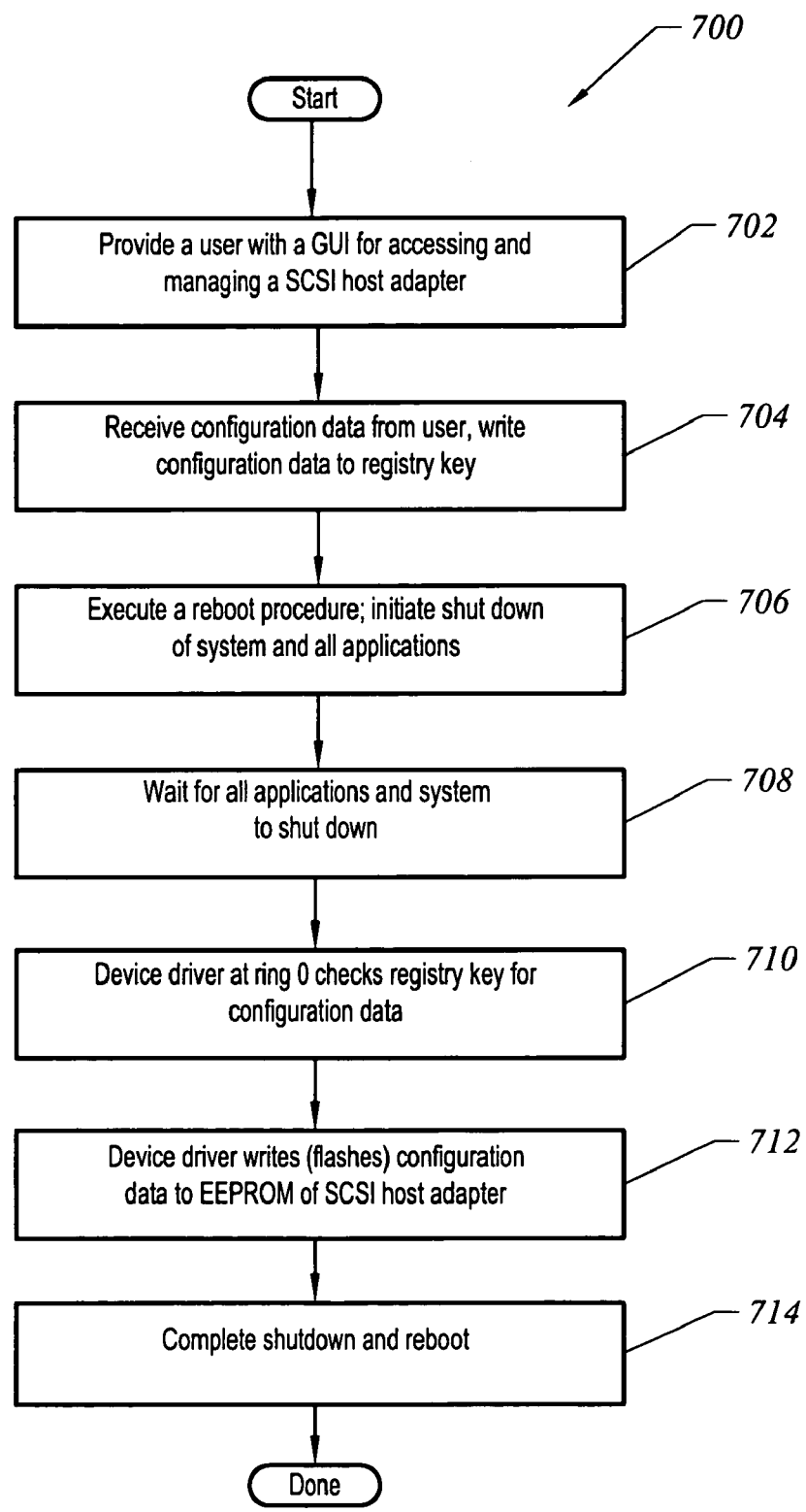
FIG. 7 is a flowchart diagram of the method operations performed for accessing and making changes to a host adapter in accordance with another embodiment of the invention.

FIG. 7 is a flowchart diagram 700 of the method operations performed for accessing and making changes to a host adapter in accordance with another embodiment of the invention. The method begins with operation 702 in which a user is provided a GUI for accessing and managing a SCSI host adapter. As described above in reference to FIG. 6, the GUI provided is a high level GUI, and operation 702 is identical to operation 602 as described above.

The method continues with operation 704 in which configuration data is received from a user. The user makes the desired settings or configuration changes through the provided GUI, such as the advanced settings GUI for the selected host adapter. When the user saves the desired changes, the configuration or settings changes are saved to a registry key. The registry key is a dedicated operation that is read and executed by system or device drivers during specified operations as will be described below.

Next, the method executes a reboot procedure in operation 706. As described above in reference to FIG. 6, any host adapter configuration or settings changes cannot be implemented while the host adapter is actively processing data, or any data is being processed by connected peripheral devices. In one embodiment, the user is prompted that a reboot is required, and provided with a command to execute a reboot. In operation 706, the user has selected, and the system executes the reboot command. In executing a reboot, the system begins to shut down all applications and peripheral devices.

In operation 708, the system continues with the shut down sequence. Any active data is finally processed, the peripheral devices are shut down, all applications are closed, and the system prepares to shut down the operating system.

Next, in operation 710, the system executes final Ring 0 or kernel mode operations just prior to shutting down the operating system. Device drivers in Ring 0 execute programmed operations in accordance with operating system parameters, and in operation 710, a device driver checks the registry key for configuration data. If data is present, the data is processed as described below. If no data has been written to the designated registry key, no new settings or configuration data for the host adapter will be processed. In FIG. 7, configuration data was written to a registry key in operation 704. This configuration data is read in operation 710, and the method advances to operation 712.

In operation 712, the device driver writes or "flashes" the configuration data to the EEPROM of the SCSI host adapter. At this point in the shut down procedure, all peripheral devices have been shut down, all applications have been closed, and no data is being processed by the computer system except for the device drivers at Ring 0 performing the final sequences of the operating system shut down. Therefore, it is possible to write the configuration settings to the EEPROM of the SCSI host adapter at this point. The host adapter configuration or settings information data read from the registry key is thus written to the EEPROM of the SCSI host adapter in operation 712.

The method advances to operation 714 where the system is finally shut down and the computer is restarted. As described above, the BIOS executes the system initialization. The BIOS reads the host adapter configuration settings from the EEPROM and initializes the system in accordance with those settings. The user, having changed the settings through a GUI in the Windows® environment, is presented with a system in accordance with the new settings, and the method is done.

The present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for modifying a configuration of a host adapter for a computer, the host adapter allowing communication between the computer and a peripheral device connected to the host adapter, the method comprising:

generating a graphical user interface, the graphical user interface being configured to allow a user to access configuration settings of the host adapter;

receiving instructions via the graphical user interface, the instructions comprising changes to the configuration settings of the host adapter;

saving the changes to a file in a storage location, the changes being saved without being activated;

rebooting the computer, the rebooting using code having program instructions for: locating the file having the changes, reading the changes saved to the file in the storage location, and writing the changes to a nonvolatile memory of the host adapter of the computer, wherein the reading and the writing are performed during the rebooting of the computer; and activating the changes for the host adapter during the rebooting of the computer so that the computer uses the changes when communicating with the host adapter, wherein the graphical user interface provides the user with a look and feel of system components visible and accessible through the operating system of the computer.

2. The method of claim 1, further comprising:

informing the user that the changes will not be available until the computer is rebooted; and prompting the user to execute a reboot command.

3. The method of claim 1, wherein the configuration settings includes what peripheral devices are connected to the host adapter.

4. The method of claim 1, wherein a host adapter icon represents the host adapter in the graphical user interface.

5. The method of claim 4, further comprising:

receiving a selection of host adapter icon in the graphical user interface, the graphical user interface providing, in response to the selection, access to the host adapter and the peripheral device connected to the host adapter.

6. The method of claim 5, wherein the graphical user interface provides access to the configuration settings of the host adapter in response to the selection of the host adapter icon.

7. The method of claim 5, wherein the graphical user interface provides access to diagnostic tools for managing the configuration of the host adapter in response to the selection of the host adapter icon.

8. The method of claim 5, wherein access to the peripheral devices connected to the host adapter includes providing for configuration and management of the peripheral devices connected to the host adapter.

9. The method of claim 1, wherein the host adapter is a SCSI host adapter.

10. The method of claim 1, wherein a system BIOS of the computer reads the changes saved to the file in the storage location.

11. The method of claim 1, wherein the storage location is defined in storage associated with one of a hard drive of the computer and a memory chip.

12. The method of claim 11, wherein a system BIOS writes the changes to an EEPROM of the host adapter.

13. A method for accessing and modifying a configuration of a host adapter for a computer, the host adapter providing communication between the computer and a peripheral device connected to the computer, the method comprising:

generating a graphical user interface that provides access to the configuration of the host adapter;

receiving instructions to modify the configuration via the graphical user interface, the instructions comprising changes to the configuration;

saving the changes to a registry key, the changes being saved without being activated;

receiving a command to reboot the computer;

performing a reboot operation when the command to reboot the computer is received;

reading the changes saved to the registry key during the reboot operation; and writing the changes to a nonvolatile memory of the host adapter of the computer during the reboot operation, wherein the graphical user interface provides the user with a look and feel of system components visible and accessible through the operating system.

14. The method of claim 13, wherein the reboot operation includes shutting down all applications and all system devices.

15. The method of claim 14, wherein the reading of the changes is carried out by a device driver at Ring 0 after the shutting down of all the applications.

16. The method of claim 15, wherein the writing of the changes to the nonvolatile memory of the host adapter of the computer is by the device driver at Ring 0 after the reading of the changes.

17. The method of claim 16, wherein the reboot operation includes shutting down of an operating system after the writing of the changes to the nonvolatile memory of the host adapter and then an executing a boot sequence of a system BIOS.

18. The method of claim 17, further comprising:

reading the configuration of the host adapter with the configuration changes by the system BIOS during the boot sequence; and initializing the computer and the host adapter in accordance with the configuration of the host adapter with the changes.

19. The method of claim 13, wherein the host adapter is a SCSI host adapter.

20. The method of claim 13, further comprising:

generating a host adapter icon in the graphical user interface, the host adapter icon being configured to provide graphical user interface driven access to the host adapter and any device connected to the host adapter;

informing the user that the changes will not be available until the reboot operation is complete; and prompting the user to select the command to reboot the computer.

21. The method of claim 20, wherein access to any device connected to the host adapter includes providing for configuration and management of any device connected to the host adapter.

22. A method for enabling graphical user interface driven modifications of settings in an EEPROM associated with a SCSI host adapter connected to a computer, the method comprising:

displaying a graphical user interface, the graphical user interface providing a list of selectable configuration options;

receiving user selections of the configuration options provided by the list;

writing the user selections to a storage location, the writing being performed without activating the user selections;

rebooting the computer using code having program instructions for reading the user selections, writing the user selections to the EEPROM, and completing the rebooting, the SCSI host adapter being configured to operate in accordance with the user selections, wherein the graphical user interface provides a user with a look and feel of system components visible and accessible through the operating system of the computer.

23. The method of claim 22, wherein the graphical user interface includes selections to initiate diagnostic testing of the SCSI host adapter.

24. The method of claim 22, wherein the storage location is defined in storage associated with one of a hard drive of the computer and a memory chip.

25. The method of claim 22, wherein the graphical user interface is displayed following a selection of a SCSI host adapter icon.

* * * * *